(No Model.)

J. REILLY.
DEVICE FOR SEPARATING OIL FROM FEED WATER.

No. 473,591. Patented Apr. 26, 1892.

WITNESSES:
Gustave Dieterich
C. Aug. Dieterich

INVENTOR
James Reilly,
BY Chas. O. Gill
ATTORNEY.

UNITED STATES PATENT OFFICE.

JAMES REILLY, OF BROOKLYN, NEW YORK.

DEVICE FOR SEPARATING OIL FROM FEED-WATER.

SPECIFICATION forming part of Letters Patent No. 473,591, dated April 26, 1892.

Application filed August 14, 1891. Serial No. 402,607. (No model.)

*To all whom it may concern:*

Be it known that I, JAMES REILLY, a citizen of the United States, and a resident of Brooklyn, in the county of Kings and State of New York, have invented certain new and useful Improvements in Devices for Separating Oil from Feed-Water, of which the following is a specification.

The invention relates to improvements in devices for separating the oil, air, and other impurities from feed-water; and it consists in a novel chamber intermediate the points of supply and delivery, through which chamber the water passes under pressure and in which the oil, air, and other impurities are separated from the water, the latter passing into the delivery-pipe, while the oil and air are caused to escape through a valve at the top of said chamber and the heavy particles of foreign matter accumulate in the bottom of the chamber, where an exit-valve is provided.

The particular construction of the device made the subject of this specification is illustrated in the accompanying drawings and described hereinafter; and the object of this invention is to relieve the feed-water from the oil and other matters by means which are effectual, void of complications, and capable of being easily employed and cleansed.

Figure 1:
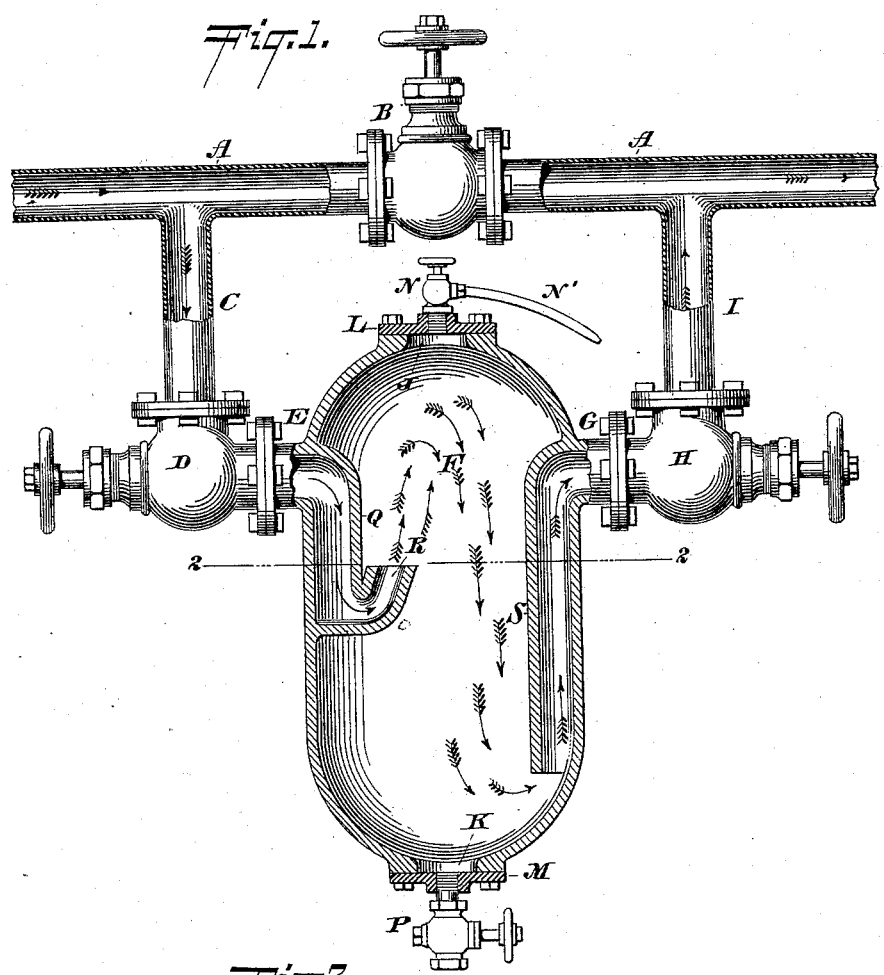
Figure 2:
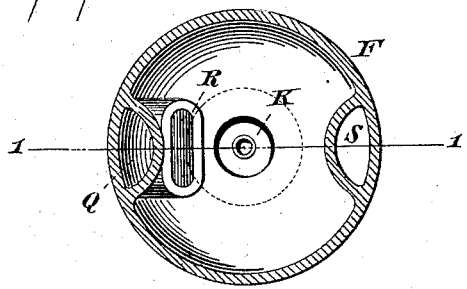

Referring to the accompanying drawings, Figure 1 is a central vertical section of a device embodying the invention, the section being on the dotted line 1 1 of Fig. 2, which is a transverse section of same on the dotted line 2 2 of Fig. 1.

In the drawings, A designates the main pipe for the water, and B a valve therein, by which the water may be turned from its direct passage through said pipe into the branch pipe C, connected through the valve D and branch E with one side of the chamber or casing F, which at its opposite side is connected through the branch G, valve H, and pipe I with the main pipe A at a point beyond the valve B. The chamber F, with its connecting-pipes, forms a passage around the valve B, and hence when the latter is closed the body of water will be caused to move through said chamber and its connections. The valves D H may also be more or less opened or closed to entirely cut off the passage of the water through the chamber F or to regulate the same, as may be desired. When it is not desired to use the chamber F, the valves D H will be entirely closed and the valve B opened, whereupon the water will pass directly through the pipe A.

The chamber or casing F is circular in transverse section and somewhat elliptical in vertical section and is provided at its upper and lower ends, respectively, with the openings J K and the caps or flanges L M, bolted over said openings. Into the cap or flange L at the upper end of the chamber is screwed the valve N, having the inclined escape-pipe N' leading therefrom, and into the cap or flange M at the lower end of said chamber is screwed the valve P. The valve P should remain entirely closed, except at such time as it may be desired to clean out the heavy foreign matter which may have accumulated at the bottom of the chamber F.

The chamber or casing F at its inlet side is provided with the downwardly-extending pipe or passage Q, having at its lower end the upturned and inwardly-inclined branch R, which terminates, preferably, somewhat above the transverse center of the chamber. The pipe Q forms a continuation of the branch E, and through it the water enters the chamber F. At the outlet side of the chamber F is provided the exit-pipe S, which extends from a point adjacent to the lower end of the chamber upward to the branch G, whence it connects with the valve H and pipe I, leading to the main pipe A.

In the operation of the apparatus the water passes from the pipe A downward through the pipe C, valve D, and branch E into the pipe Q, and thence upward through the branch R into the chamber F, and said water returns to the pipe A by passing upward through the pipe S, branch G, valve H, and pipe I. While passing through the chamber F the water is relieved of its impurities, the heavy foreign particles settling in the lower end of the chamber, while the globules of oil and bubbles of air ascend to the upper end of the chamber and find an exit through the valve N and pipe N'. The valve N will be opened more or less, as circumstances may require. When it is opened to its full extent, the oil and air will escape more freely and the body of water will ascend farther in the chamber F, and when the valve N is partly closed the body of air will be in a measure held in the upper end of the chamber and operate as a cushion, which will prevent the water from ascending beyond a certain limit in said chamber. The upturned and inwardly-inclined branch R on the pipe Q directs the air and oil upward toward the upper end of the chamber F and aids in the rapid and effectual purification of the water. The upper rounded end of the casing F operates as a chamber for oil and air, while the lower rounded end of said casing serves as a chamber for heavy foreign matter. It will be seen that the casing or chamber F is relieved of all complications, and that it is durable, easily understood, and capable of being regulated and cleansed at will. The device is also thoroughly effective.

What I claim as my invention, and desire to secure by Letters Patent, is—

1. The chamber F, having the inlet-pipe Q and outlet-pipe S, combined with the escape-valve N at the upper end of said chamber, the valve D and pipe C, connecting with said pipe Q, and the valve H and pipe I, leading from the pipe S, substantially as set forth.

2. The chamber F, having the inlet-pipe Q, branch R, and outlet-pipe S, combined with the escape-valve N for oil and air at the upper end of said chamber and the exit at the lower end of said chamber, substantially as set forth.

3. The main water-pipe having the valve B and branch pipes C I, combined with the chamber F, the inlet and outlet pipes Q S in said chamber, the branch E and valve D, connecting said inlet-pipe with the pipe C, the branch G and valve H, connecting said outlet-pipe with the pipe I, the escape-valve N at the upper end of said chamber, and the exit-valve P at the base of said chamber, substantially as set forth.

Signed at New York, in the county of New York and State of New York, this 12th day of August, A. D. 1891.

JAMES REILLY.

Witnesses:
  CHAS. C. GILL,
  R. A. PORTEOUS.